US011967453B2

(12) United States Patent
Huang

(10) Patent No.: US 11,967,453 B2
(45) Date of Patent: Apr. 23, 2024

(54) TRANSFORMER AND METHOD OF GENERATING MULTIPLE MULTIPHASE OUTPUT SIGNALS

(71) Applicant: THE BOEING COMPANY, Chicago, IL (US)

(72) Inventor: Jian Huang, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 654 days.

(21) Appl. No.: 16/386,418

(22) Filed: Apr. 17, 2019

(65) Prior Publication Data

US 2020/0335271 A1    Oct. 22, 2020

(51) Int. Cl.
| H01F 30/12 | (2006.01) |
| H01F 27/24 | (2006.01) |
| H01F 27/28 | (2006.01) |
| H01F 30/02 | (2006.01) |
| H02M 5/10 | (2006.01) |
| H02M 5/14 | (2006.01) |
| H02M 7/04 | (2006.01) |
| H02M 7/12 | (2006.01) |

(52) U.S. Cl.
CPC ............. *H01F 30/12* (2013.01); *H01F 27/24* (2013.01); *H01F 27/28* (2013.01); *H01F 30/02* (2013.01); *H02M 7/12* (2013.01); *H02M 5/10* (2013.01); *H02M 5/14* (2013.01); *H02M 7/043* (2013.01)

(58) Field of Classification Search
CPC combination set(s) only.
See application file for complete search history.

(56) References Cited

U.S. PATENT DOCUMENTS

| 4,779,181 | A | * | 10/1988 | Traver | H02M 5/14 336/5 |
| 5,898,302 | A | * | 4/1999 | Soules | G01N 27/72 324/209 |
| 6,256,213 | B1 | | 7/2001 | Illingworth | |
| 7,772,953 | B2 | | 8/2010 | Huang et al. | |
| 7,772,954 | B2 | | 8/2010 | Huang et al. | |
| 2002/0186112 | A1 | * | 12/2002 | Kamath | H01F 30/02 336/5 |
| 2010/0148899 | A1 | * | 6/2010 | Huang | H01F 30/14 336/12 |
| 2016/0094143 | A1 | * | 3/2016 | Huang | H02J 9/061 336/170 |

OTHER PUBLICATIONS

McLyman, William T., "Transformer and Inductor Design Handbook," Third Edition, Revised and Expanded, 2004, Marcel Dekker, Inc., 533 pgs.

* cited by examiner

*Primary Examiner* — Gary A Nash
(74) *Attorney, Agent, or Firm* — Barta Jones, PLLC

(57) ABSTRACT

An apparatus includes a primary transformer circuit including a plurality of primary coils. The apparatus further includes a delta secondary transformer circuit configured to magnetically couple to the primary transformer circuit. The delta secondary transformer circuit includes a first plurality of secondary coils, a first plurality of nodes coupled to the first plurality of secondary coils, and a second plurality of secondary coils configured to magnetically couple to the plurality of primary coils. Each coil of the second plurality of secondary coils is physically coupled to a respective node of the first plurality of nodes.

24 Claims, 9 Drawing Sheets

TRANSFORMER AND METHOD OF GENERATING MULTIPLE MULTIPHASE OUTPUT SIGNALS

FIELD

The present disclosure is generally related to electrical components and more specifically to transformers.

BACKGROUND

Aircraft and other vehicles include electrical components that provide electrical energy (i.e., power) various vehicle systems and devices. For example, an aircraft can include a generator that provides alternating current (AC) power and can further include cables (e.g., "feeders") that provide the AC power to certain components of the aircraft.

In some aircraft, AC power supplied by a generator is converted to direct current (DC) power. In one example, an aircraft includes a transformer rectifier unit (TRU) that converts AC power to a DC signal that powers certain aircraft components. In this example, some aircraft components are supplied with AC power, and other aircraft components are supplied with DC power.

Such electrical components and systems can use significant area of an aircraft, reducing available area for passengers, crew, cargo, and other aircraft components, as well as increasing production cost. Further, electrical components and systems of an aircraft can add a significant amount of weight to an aircraft, increasing aircraft fuel consumption. As a particular example, feeders used on an aircraft can be large and heavy.

To reduce weight associated with electrical components, certain aircraft use a high-voltage generator in connection with reduced-size feeders. For example, an aircraft may include a generator that produces a high-voltage signal that is conveyed using feeders and then "stepped down" to a lower-voltage signal. To step down the high-voltage signal, an auto transformer unit (ATU) is typically used. An ATU can reduce available area of an aircraft while also increasing production cost and fuel consumption of the aircraft.

SUMMARY

In a particular example, an apparatus includes a primary transformer circuit including a plurality of primary coils. The apparatus further includes a delta secondary transformer circuit configured to magnetically couple to the primary transformer circuit. The delta secondary transformer circuit includes a first plurality of secondary coils, a first plurality of nodes coupled to the first plurality of secondary coils, and a second plurality of secondary coils configured to magnetically couple to the plurality of primary coils. Each coil of the second plurality of secondary coils is physically coupled to a respective node of the first plurality of nodes.

In another example, method of operating a transformer includes receiving a multiphase alternating current (AC) input signal at a transformer. The method further includes generating, using a primary transformer circuit of the transformer and based on the multiphase AC input signal, a first multiphase AC output signal. The method further includes generating, using a secondary transformer circuit of the transformer, a first plurality of signals of a second multiphase AC output signal. The method also includes generating, using the secondary transformer circuit of the transformer, a second plurality of signals of the second multiphase AC output signal and providing the second multiphase AC output signal to a rectifier.

In another example, an aircraft includes a primary transformer circuit including a plurality of primary coils. The aircraft further includes a delta secondary transformer circuit configured to magnetically couple to the primary transformer circuit. The delta secondary transformer circuit includes a first plurality of secondary coils, a first plurality of nodes coupled to the first plurality of secondary coils, and a second plurality of secondary coils configured to magnetically couple to the plurality of primary coils. Each coil of the second plurality of secondary coils is physically coupled to a respective node of the first plurality of nodes. The aircraft further includes a rectifier coupled to the delta secondary transformer circuit.

DETAILED DESCRIPTION

In a particular implementation, a transformer is configured to generate multiple multiphase alternating current (AC) output signals, such as multiphase AC output signals conventionally generated using an auto transformer unit (ATU) and a separate a transformer included in a transformer rectifier unit (TRU). In one example, a transformer includes a primary transformer circuit configured to generate a first multiphase AC output signal, such as a 115 volts root-mean-square (Vrms) signal (which may be conventionally generated using an ATU). In a particular example, the transformer further includes a delta secondary transformer circuit that is configured to generate a second multiphase output signal that is used to generate (e.g., via a rectifier) another signal, such as a 28 volt direct current (Vdc) signal that is typically generated using a TRU transformer that is separate from an ATU of an aircraft.

In accordance with some aspects of the disclosure, the delta secondary transformer circuit has a "tapped out" configuration. To illustrate, certain conventional secondary transformer circuits include a delta-star configuration (e.g., where a transformer includes a delta secondary circuit and a star secondary circuit that is separate from the delta secondary circuit). Such a conventional transformer can generate a six-phase AC signal that is rectified to generate a DC signal. In accordance with aspects of the disclosure, coils are connected to nodes of a delta secondary transformer circuit (e.g., instead of including the coils in a separate star secondary transformer circuit), forming a delta secondary transformer circuit having a "tapped out" configuration. Due to magnetic coupling between a primary transformer circuit and the delta secondary transformer circuit, the primary transformer circuit generates a first multiphase AC signal, such as a 115 Vrms signal, while the delta secondary transformer circuit generates a second multiphase signal that is rectified to generate a 28 Vdc signal.

In this example in accordance with some aspects of this disclosure, a single transformer is configured to generate signals conventionally produced using an ATU and a TRU transformer that is separate from the ATU. By integrating components of an ATU and a TRU transformer into a single transformer, area and weight associated with electrical components are reduced. As a result, available area of an aircraft is increased, production cost is reduced, and fuel consumption is decreased. A technical effect of embodiments herein includes a reduction in aircraft weight. A technical effect of embodiments herein includes reduced fuel consumption.

Figure 1:
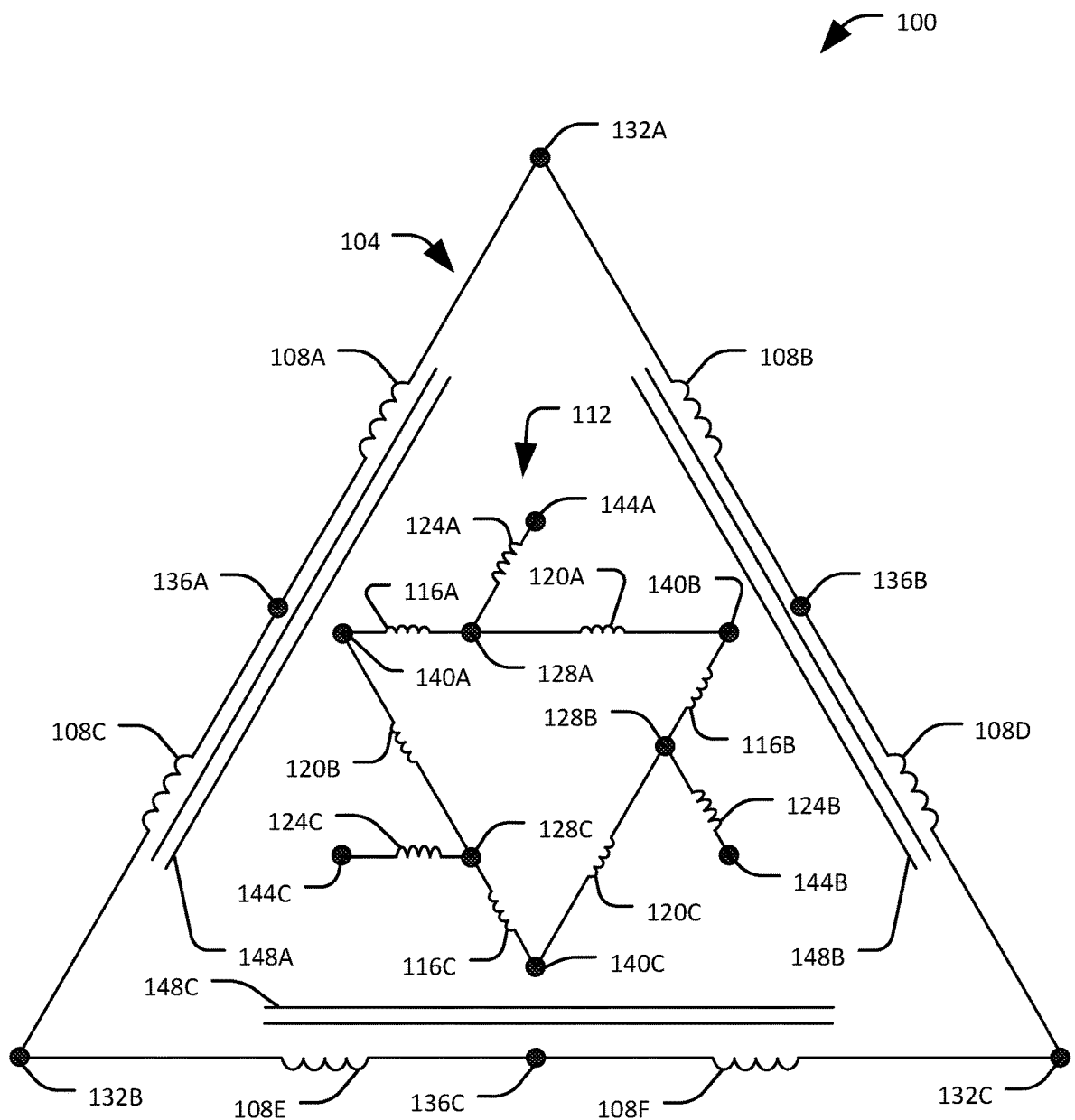
FIG. 1 is a diagram illustrating an example of a transformer in accordance with aspects of the disclosure.

Referring to FIG. 1, a particular illustrative example of a transformer is depicted and generally designated 100. In some implementations, the transformer 100 is included in a vehicle, such as an aircraft. In a particular example, the transformer 100 includes or corresponds to a combined ATU and TRU transformer.

In the example of FIG. 1, the transformer 100 includes a primary transformer circuit 104 and a delta secondary transformer circuit 112. The delta secondary transformer circuit 112 is configured to magnetically couple to the primary transformer circuit 104, such as using inductive coupling.

The primary transformer circuit 104 includes a plurality of primary coils. In the example of FIG. 1, the plurality of primary coils includes coils 108A, 108B, 108C, 108D, 108E, and 108F.

FIG. 1 also depicts that the primary transformer circuit 104 includes a plurality of nodes. For example, the plurality of nodes of the primary transformer circuit 104 includes nodes 132A, 132B, 132C, 136A, 136B, and 136C. In a particular example, the nodes 132A, 132B, and 132C correspond to a plurality of input nodes of the primary transformer circuit 104, and the nodes 136A, 136B, and 136C correspond to a plurality of output nodes of the primary transformer circuit 104, as described further with reference to FIG. 2.

The delta secondary transformer circuit 112 includes a first plurality of secondary coils configured to magnetically couple to the plurality of primary coils of the primary transformer circuit 104. For example, in FIG. 1, the first plurality of secondary coils includes coils 116A, 116B, 116C, 120A, 120B, and 120C.

The delta secondary transformer circuit 112 further includes a first plurality of nodes coupled to the first plurality of secondary coils of the delta secondary transformer circuit 112. For example, the first plurality of nodes includes nodes 128A, 128B, and 128C.

FIG. 1 also illustrates that the delta secondary transformer circuit 112 includes a second plurality of secondary coils configured to magnetically couple to the plurality of primary coils of the primary transformer circuit 104. For example, in FIG. 1, the second plurality of secondary coils includes coils 124A, 124B, and 124C. FIG. 1 also illustrates that each coil of the second plurality of secondary coils is physically coupled to a respective node of the first plurality of nodes of the delta secondary transformer circuit 112. As a particular example, the coil 124A is coupled to the node 128A. As additional examples, the coil 124B is coupled to the node 128B, and the coil 124C is coupled to the node 128C.

In a particular example, the delta secondary transformer circuit 112 further includes a second plurality of nodes coupled to second plurality of secondary coils of the delta secondary transformer circuit 112. For example, in FIG. 1, the delta secondary transformer circuit 112 includes a node 144A that is coupled to the coil 124A. As additional examples, FIG. 1 further depicts a node 144B coupled to the coil 124B and a node 144C coupled to the coil 124C.

The delta secondary transformer circuit in FIG. 1 further includes nodes 140A, 140B, and 140C. In some implementations, the nodes 140A, 140B, and 140C correspond to a first plurality of output nodes of the delta secondary transformer circuit 112, and the nodes 144A, 144B, and 144C correspond to a second plurality of output nodes of the delta secondary transformer circuit 112, as described further with reference to FIG. 2.

In certain examples, the transformer 100 of FIG. 1 includes one or more transformer cores. In some examples, each transformer core of the transformer 100 is associated with (e.g., in contact with) one or more coils of the transformer 100 (e.g., where one or more coils of the transformer 100 are wound about a transformer core). In the particular example of FIG. 1, the transformer 100 has a three-legged configuration that includes a first transformer core 148A, a second transformer core 148B, and a third transformer core 148C. In some examples, coils of the transformer 100 are wound about the transformer cores 148A, 148B and 148C. Although the particular example of FIG. 1 illustrates three transformer cores 148A, 148B and 148C, in other implementations, a different number of transformer cores may be used. Further, depending on the particular implementation, the transformer cores 148A, 148B, and 148C can include steel, iron, a metal alloy, another other type of material, or a combination thereof.

The particular arrangement and type of coils of the transformer 100 can be selected based on the particular application. For example, the number of coils may vary based on the particular application. Alternatively or in addition, a number of windings of a coil can be selected to determine a particular characteristic of the transformer 100. In some examples, the coils 108A, 108B, 108C, 108D, 108E, and 108F have a first number of turns, the coils 116A, 116B, and 116C have a second number of turns, the coils 120A, 120B, and 120C have a third number of turns, and the coils 124A, 124B, and 124C have a fourth number of turns. In some examples, the first number, the second number, the third number, and the fourth number are selected to determine a particular voltage transformation characteristic of the transformer 100, a phase relationship between input signals and output signals of the transformer 100, one or more other characteristics of the transformer 100, or a combination thereof.

During operation, the transformer 100 receives signals and transforms (e.g., steps down) the input signals to generate output signals based on magnetic coupling between coils of the primary transformer circuit 104 and coils of the delta secondary transformer circuit 112. To illustrate, in FIG. 1, the coils 108A, 108C, 116B, 120C, and 124A are associated with (e.g., wound around) the first transformer core 148A, the coils 108D, 108B, 116C, 120B, and 124B are associated with (e.g., wound around) the second transformer core 148B, and the coils 108E, 108F, 116A, 120A, and 124C are associated with (e.g., wound around) the second transformer core 148C. In this example, the transformer 100 is configured to generate output signals based on magnetic coupling between coils of the first transformer core 148A and coils of the second transformer core 148B, based on magnetic coupling between coils of the second transformer core 148B and coils of the third transformer core 148C, and based on magnetic coupling between coils of the third transformer core 148C and coils of the first transformer core 148A.

In some implementations, aspects of the transformer 100 of FIG. 1 reduce vehicle weight, reducing fuel consumption as compared to conventional transformers. For example, in some implementations, the transformer 100 of FIG. 1 is configured to perform operations typically performed by multiple transformers of an ATU and a TRU, as described further with reference to the example of FIG. 2.

Figure 2:
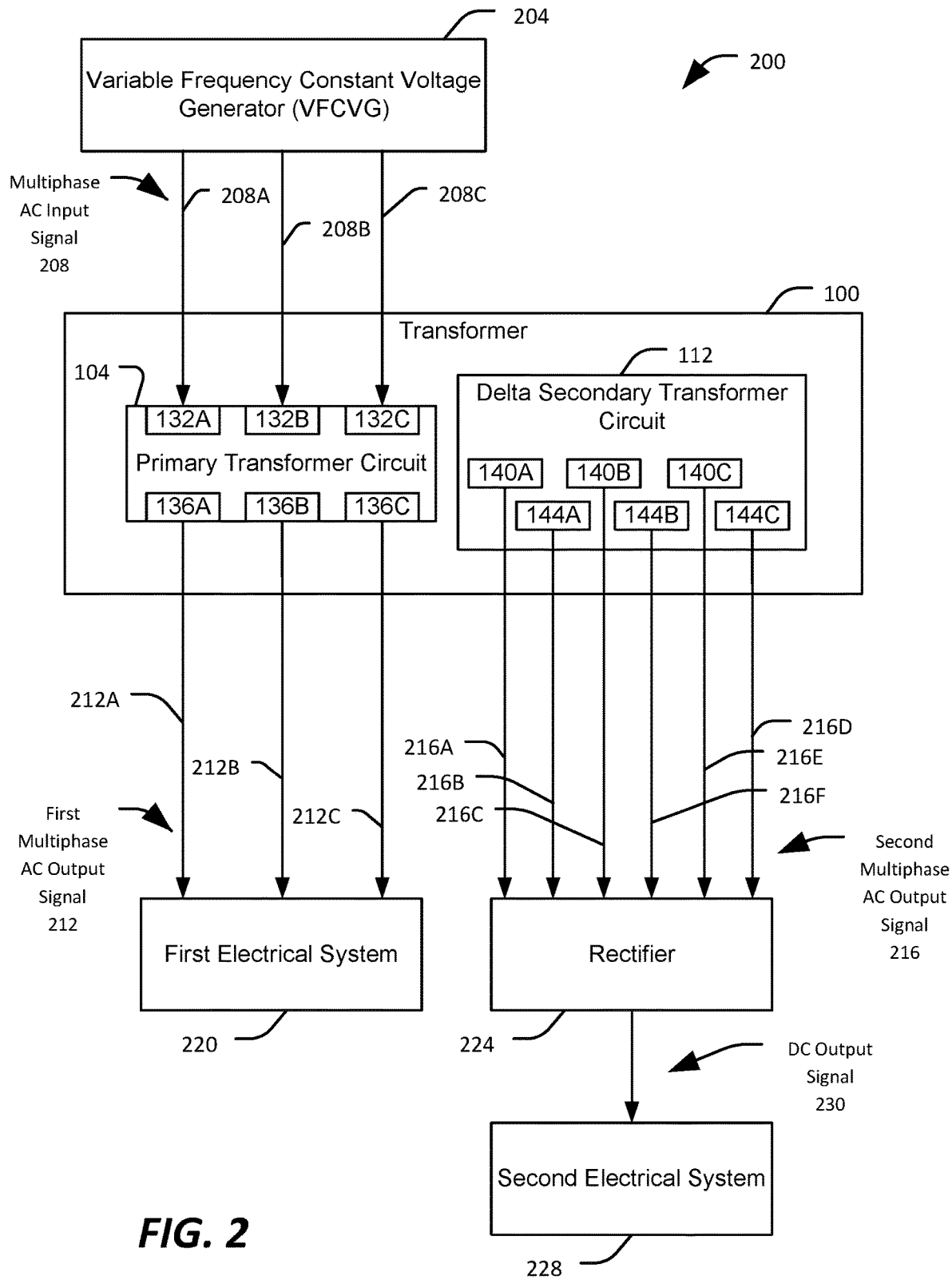
FIG. 2 is a diagram illustrating certain aspects of an example of a system that includes the transformer of FIG. 1.

Referring to FIG. 2, a particular illustrative example of a system is depicted and generally designated 200. The system 200 of FIG. 2 includes the transformer 100 of FIG. 1.

In the example of FIG. 2, the system 200 includes a variable frequency constant voltage generator (VFCVG) 204. The VFCVG 204 is coupled to the transformer 100. For example, in FIG. 2, the VFCVG 204 is coupled to the nodes 132A, 132B, and 132C of the transformer 100.

The system 200 further includes a first electrical system 220 that is coupled to the primary transformer circuit 104. For example, in FIG. 2, the first electrical system 220 is coupled to the nodes 136A, 136B, and 136C. In some examples, the first electrical system 220 includes components of a vehicle (e.g., an aircraft) that are configured to operate using alternating current (AC) power having a variable frequency. As a particular example, in some implementations, the first electrical system 220 includes a fan motor of an aircraft, AC-based lighting of an aircraft, one or more other components of an aircraft, or a combination thereof.

The system 200 further includes a rectifier 224 and a second electrical system 228. In FIG. 2, the rectifier 224 is coupled to the nodes 140A, 140B, 140C, 144A, 144B, and 144C, and the second electrical system 228 is coupled to the rectifier 224. In some examples, the rectifier 224 includes six input terminals coupled to the nodes 140A, 140B, 140C, 144A, 144B, and 144C. In some examples, the rectifier 224 includes a full bridge rectifier circuit, as an illustrative example.

In some examples, the second electrical system 228 includes components of a vehicle (e.g., an aircraft) that are configured to operate using direct current (DC) power. As a particular example, in some implementations, the second electrical system 228 includes instrumentation of an aircraft, one or more radios of an aircraft, DC-based lighting of an aircraft, one or more other components of an aircraft, or a combination thereof.

During operation, the VFCVG 204 generates a multiphase alternating current (AC) input signal 208. The multiphase AC input signal 208 includes signals 208A, 208B, and 208C having a particular phase relationship (e.g., a 120 degree phase offset). As used herein, a multiphase AC signal (e.g., the multiphase AC input signal 208) refers to a plurality of signals having a particular voltage level and a particular phase relationship (e.g., a 120 degree phase relationship, as an illustrative example).

In some implementations, the VFCVG 204 includes a plurality of single-phase sources (e.g., six single-phase alternators) configured to generate the multiphase AC input signal 208. In other implementations, the VFCVG 204 has another configuration. For example, in some implementations, the VFCVG 204 includes multiple two-phase sources (e.g., three two-phase alternators) configured to generate the multiphase AC input signal 208.

In some implementations, frequency of the multiphase AC input signal 208 varies during operation of the VFCVG 204. To illustrate, in one example, the multiphase AC input signal 208 has a target frequency of approximately 400 hertz (Hz) and can vary (e.g., within a particular range, such as 350-800 Hz, as an illustrative example) depending on certain conditions, such as engine speed, as an illustrative example.

In the example of FIG. 2, the VFCVG 204 is configured to provide the multiphase AC input signal 208 to the transformer 100 (e.g., via the nodes 132A, 132B, and 132C). In a particular example, the multiphase AC input signal 208 has a voltage of 230 volts root-mean-square (Vrms).

In FIG. 2, the primary transformer circuit 104 is configured to receive the multiphase AC input signal 208 via the nodes 132A, 132B, 132C. In one example, the primary transformer circuit 104 is configured to generate a first multiphase AC output signal 212 based on the multiphase AC input signal 208. In FIG. 2, the first multiphase AC output signal 212 includes signals 212A, 212B, and 212C having a particular phase relationship (e.g., a 120 degree phase offset). In a particular example, the first multiphase AC output signal 212 has a voltage of 115 Vrms.

In a particular example, the first multiphase AC output signal 212 is provided to the first electrical system 220 via the nodes 136A, 136B, 136C. For example, in some implementations, the first electrical system 220 includes components of a vehicle (e.g., an aircraft) configured to operate based on AC power supplied by the first multiphase AC output signal 212.

In a particular example, the delta secondary transformer circuit 112 is configured to generate a second multiphase AC output signal 216. For example, the delta secondary transformer circuit 112 is configured to generate the second multiphase AC output signal 216 based on magnetic coupling with the primary transformer circuit 104 and in response to the multiphase AC input signal 208 received at the primary transformer circuit 104. In FIG. 2, the second multiphase AC output signal 216 includes signals 216A, 216B, 216C, 216D, 216E, and 216F. In a particular example, the second multiphase AC output signal 216 has a voltage of 12.55 Vrms (line to neutral). In some examples, the second multiphase AC output signal 216 can be rectified to 28 volts direct-current (Vdc) (positive DC bus to neutral). In some implementations, the signals 216A, 216B, 216C, 216D, 216E, and 216F have a 60 degree phase offset, as described further with reference to FIG. 3.

In a particular example, the delta secondary transformer circuit 112 is configured to provide the second multiphase AC output signal 216 to the rectifier 224 (e.g. via the nodes 140A, 140B, 140C, 144A, 144B, 144C). In one example, the nodes 140A, 140B, and 140C correspond to a first plurality of nodes configured to output a first plurality of signals (e.g., the signals 216A, 216C, and 216E), and the nodes 144A, 144B, and 144C correspond to a second plurality of nodes configured to output a second plurality of signals (e.g., the signals 216B, 216D, and 216F). In this example, the first plurality of nodes and the second plurality of nodes are configured to output the second multiphase AC output signal 216.

In a particular example, the rectifier 224 is configured to generate a DC output signal 230 based on the second multiphase AC output signal 216. In a particular example, the DC output signal 230 has a voltage of 28 Vdc. As used herein, a DC signal (e.g., the DC output signal 230) can refer to a single signal (e.g., a single-ended signal) having a voltage level or to a multi-polarity signal (e.g., a dual-polarity signal, such as a differential signal).

In one example, the rectifier 224 is configured to provide the DC output signal 230 to the second electrical system 228. For example, in some implementations, the second electrical system 228 includes components of a vehicle (e.g., an aircraft) configured to operate based on DC power supplied by the DC output signal 230.

In some implementations, the multiphase AC input signal 208 has a first voltage, the first multiphase output signal 212 has a second voltage that is less than the first voltage, and the second multiphase AC output signal 216 has a third voltage that is less than the second voltage. In one example, the first voltage is 230 Vrms, the second voltage is 115 Vrms, and the third voltage is 12.55 Vrms (line to neutral). To illustrate, in some implementations, a number of windings of coils of the primary transformer circuit 104 is approximately twice a number of windings of coils of the delta secondary transformer circuit 112. In this case, the transformer 100 can be configured to "step down" the multiphase AC input signal 208 by a factor of one-half (e.g., from 230 Vrms to 115 Vrms, as an illustrative example). In other implementations, other windings and/or voltages may be used.

In some implementations, aspects of the system 200 of FIG. 2 reduce vehicle weight, reducing fuel consumption as compared to conventional transformers. For example, in some implementations, the first multiphase AC output signal 212 and the second multiphase AC output signal 216 correspond to signals typically generated using multiple transformers of an ATU and a TRU. By generating the first multiphase AC output signal 212 and the second multiphase AC output signal 216 using a single transformer 100, vehicle weight is reduced, increasing fuel efficiency. For example, the system 200 may be embodied as a single unit that shares components (e.g., coils 108, 116, 120), reducing weight and space.

Figure 3:
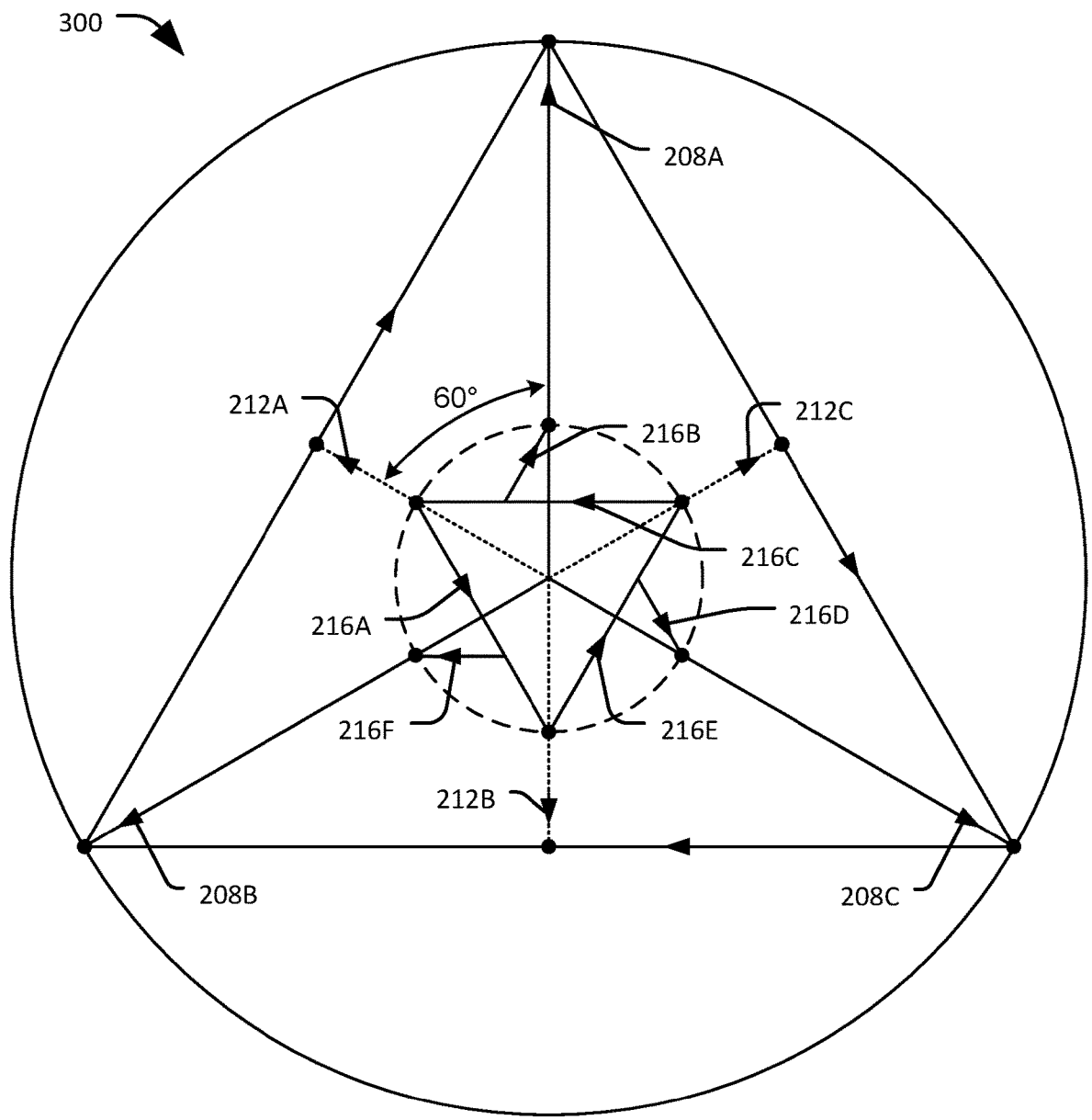
FIG. 3 is a phase diagram illustrating certain aspects of an example of operation of the transformer of FIG. 1.

Referring to FIG. 3, a phase diagram illustrating certain aspects of an example of operation of the transformer 100 is depicted and generally designated 300. In the example of FIG. 3, the phase diagram 300 illustrates certain examples of phase relationships of the multiphase AC input signal 208, the first multiphase AC output signal 212, and the second multiphase AC output signal 216.

The example of FIG. 3 depicts that the signals 216A, 216B, 216C, 216D, 216E, and 216F have a 60 degree phase offset. For example, FIG. 3 depicts that a phase of the signal 216A is offset from a phase of the signal 216B by 60 degrees. As additional examples, in some implementations, the phase of the signal 216B is offset from a phase of the signal 216C by 60 degrees, and the phase of the signal 216C is offset from a phase of the signal 216D by 60 degrees. As further examples, in some implementations, the phase of the signal 216D is offset from a phase of the signal 216E by 60 degrees, the phase of the signal 216E is offset from a phase of the signal 216F by 60 degrees, and the phase of the signal 216F is offset from the phase of the signal 216A by 60 degrees.

The 60 degree phase offset illustrated in FIG. 3 can improve device performance compared to other conventional phase relationships of signals generated by a secondary transformer circuit. For example, in some secondary transformer circuits (such as a delta-wye secondary transformer circuit), signals have unequal phase relationships, such as where one signal is offset from another signal by 30 degrees and from another signal by 90 degrees. In a particular example, the 60 degree phase offset of FIG. 3 can improve performance of the rectifier 224 of FIG. 2, such as by reducing noise (e.g., an AC "ripple" effect) in the DC output signal 230, as an illustrative example. As another example, in some implementations, the 60 degree phase offset reduces a common mode voltage of the rectifier 224 of FIG. 2 (e.g., to zero or approximately zero), reducing noise in the DC output signal 230.

Figure 4:
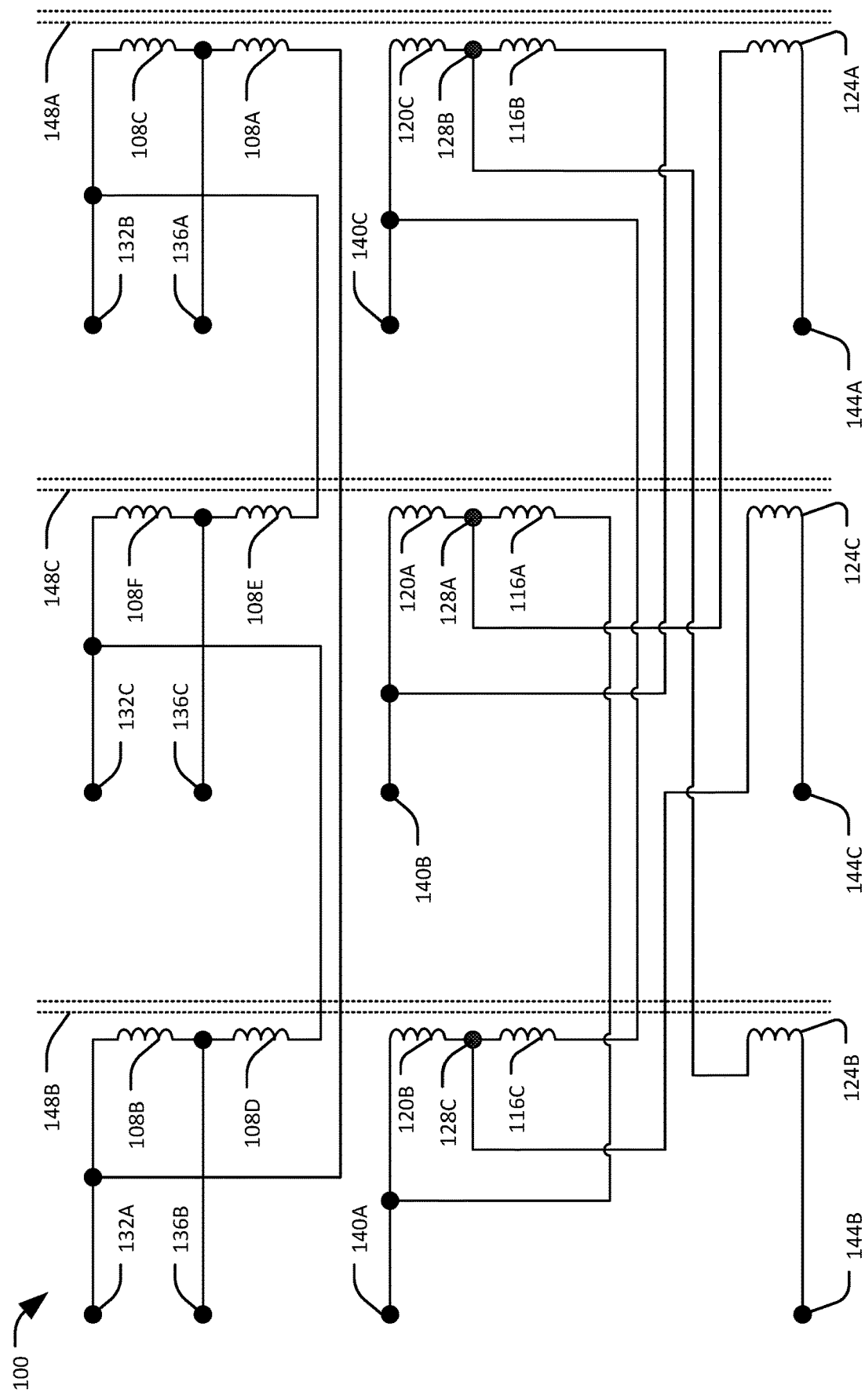
FIG. 4 is a diagram illustrating certain aspects of a particular example of the transformer of FIG. 1.

FIG. 4 depicts a particular illustrative example of the transformer 100 of FIG. 1. In the example of FIG. 4, certain coils of the transformer 100 are associated with (e.g., wound about) the transformer cores 148A, 148B, and 148C.

To illustrate, in FIG. 4, the first transformer core 148A is associated with one or more coils (e.g., the coil 108A and the coil 108C) of the plurality of primary coils of the primary transformer circuit 104 of FIG. 1. The first transformer core 148A is associated with one or more coils (e.g., the coil 116B and the coil 120C) of the first plurality of secondary coils of the delta secondary transformer circuit 112 of FIG. 1 and a first coil (e.g., the coil 124A) of the second plurality of secondary coils of the delta secondary transformer circuit 112 of FIG. 1.

The example of FIG. 4 also depicts that the second transformer core 148B is associated with one or more coils (e.g., the coil 108B and the coil 108D) of the plurality of primary coils of the primary transformer circuit 104 of FIG. 1. The second transformer core 148B is also associated with one or more coils (e.g., the coil 120B and the coil 116C) of the first plurality of secondary coils of the delta secondary transformer circuit 112 of FIG. 1 and a second coil (e.g., the coil 124B) of the second plurality of secondary coils of the delta secondary transformer circuit 112 of FIG. 1.

Further, in FIG. 4, the third transformer core 148C is associated with one or more coils (e.g., the coil 108E and the coil 108F) of the plurality of primary coils of the primary transformer circuit 104 of FIG. 1. The third transformer core 148C is also associated with one or more coils (e.g., the coil 120A or the coil 116A) of the first plurality of secondary coils of the delta secondary transformer circuit 112 of FIG. 1 and a third coil (e.g., the coil 124C) of the second plurality of secondary coils of the delta secondary transformer circuit 112 of FIG. 1.

The example of FIG. 4 illustrates that the transformer 100 can be implemented using a three-legged configuration. As a result, fewer transformer cores can be used as compared to other devices, such as devices that utilize two separate transformers and more than three transformer cores. As a result, vehicle weight is reduced, increasing fuel efficiency.

Figure 5:
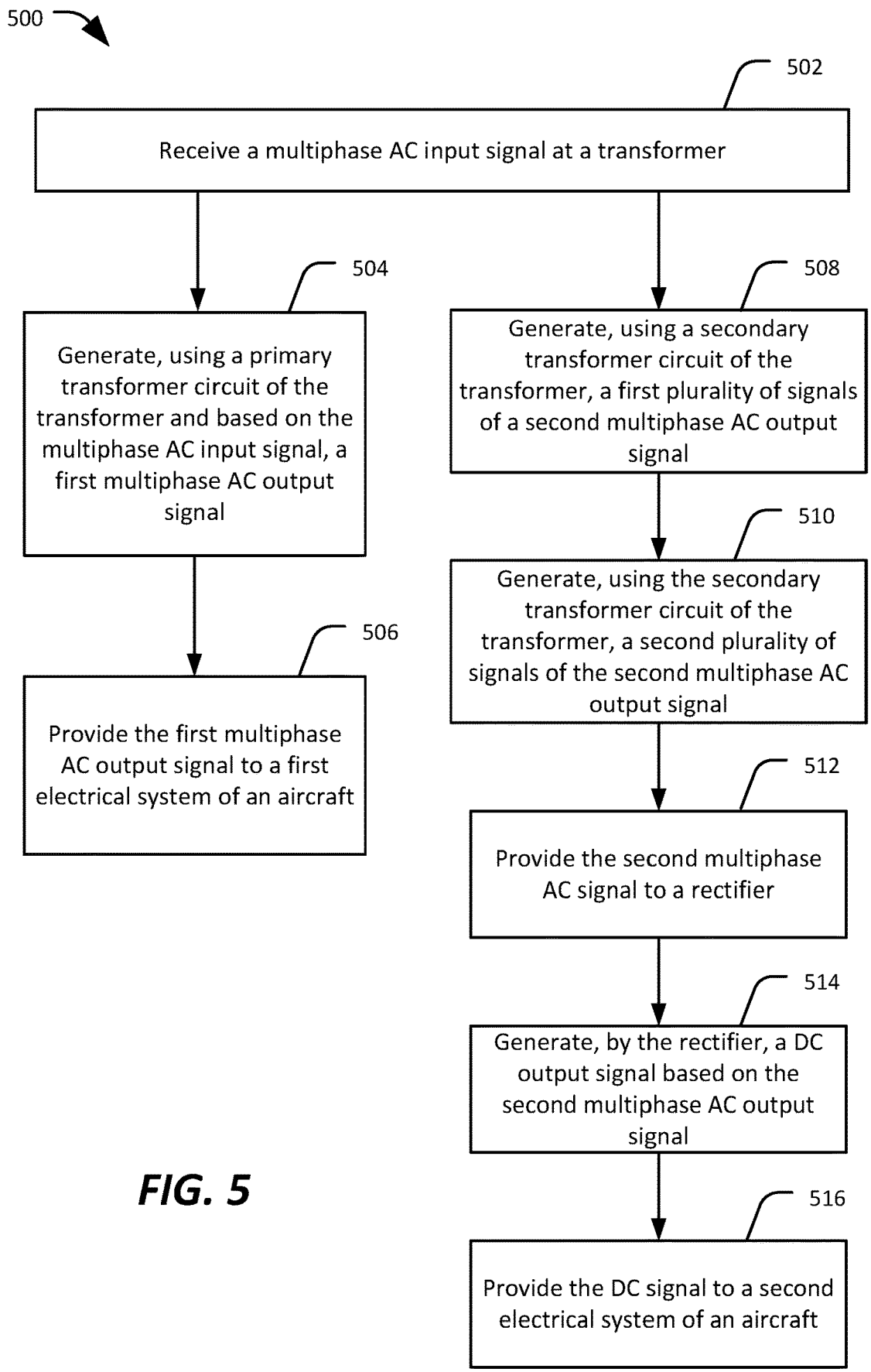
FIG. 5 is a flow chart of an example of a method of operating the transformer of FIG. 1.

Referring to FIG. 5, an illustrative example of a method of operating a transformer is depicted and generally designated 500. In a particular example, operations of the method 500 of FIG. 5 are performed using the transformer 100.

The method 500 includes receiving a multiphase AC input signal, at 502. In a particular example, the transformer 100 receives the multiphase AC input signal 208 from a power source, such as the VFCVG 204.

The method 500 includes generating, using a primary transformer circuit of the transformer and based on the multiphase AC input signal, a first multiphase AC output signal, at 504. In one example, the transformer 100 generates the first multiphase AC output signal 212 using the primary transformer circuit 104 based on the multiphase AC input signal 208.

In some examples, the method 500 further includes providing the first multiphase AC output signal to a first electrical system of an aircraft, at 506. In one example, the transformer 100 (or another component) provides the first multiphase AC output signal 212 to the first electrical system 220 as a power source of the first electrical system 220.

The method 500 further includes generating, using a secondary transformer circuit of the transformer, a first plurality of signals of a second multiphase AC output signal, at 508. In one example, the transformer 100 generates the signals 216A, 216C, and 216E of the second multiphase AC output signal 216 using the delta secondary transformer circuit 112.

The method 500 further includes generating, using the secondary transformer circuit of the transformer, a second plurality of signals of the second multiphase AC output signal, at 510. In one example, the transformer 100 generates the signals 216B, 216D, and 216F of the second multiphase AC output signal 216 using the delta secondary transformer circuit 112.

The method 500 further includes providing the second multiphase AC output signal to a rectifier, at 512. In a particular example, the transformer 100 provides the second multiphase AC output signal 216 to the rectifier 224.

In some examples, the method 500 further includes generating, by the rectifier, a DC output signal based on the second multiphase AC output signal, at 514. In a particular example, the rectifier 224 generates the DC output signal 230 based on the second multiphase AC output signal 216.

In some examples, the method 500 further includes providing the DC output signal to a second electrical system of an aircraft, at 516. In one example, the rectifier 224 (or another component) provides the second multiphase AC output signal 216 to the second electrical system 228 as a power source of the second electrical system 228.

In some implementations, aspects of the method 500 of FIG. 5 reduce vehicle weight, reducing fuel consumption as compared to conventional transformers. For example, by using a single transformer to generate multiphase AC output signals typically performed by multiple transformers of an ATU and a TRU, vehicle weight is reduced, increasing fuel efficiency.

Figure 6:
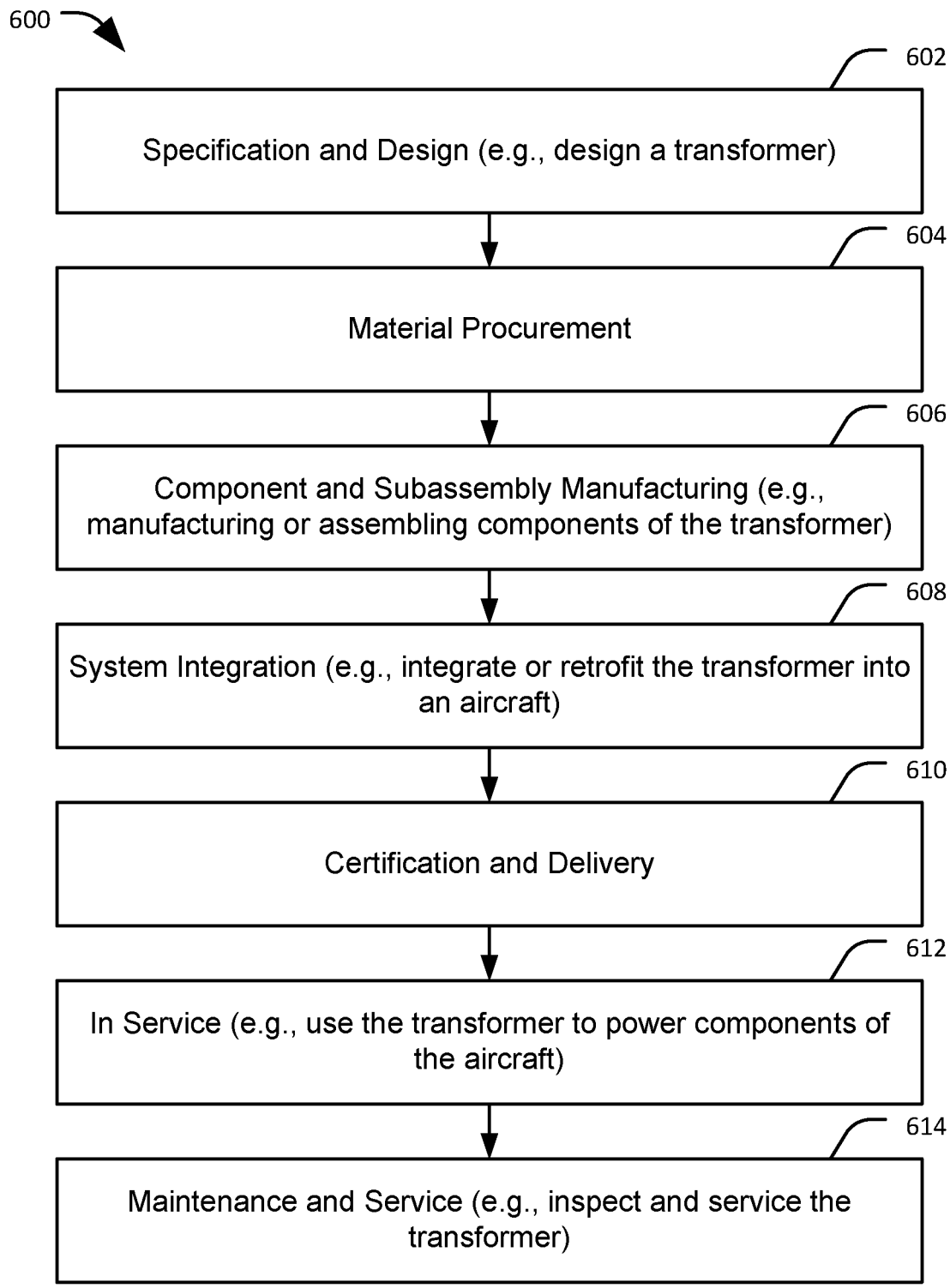
FIG. 6 is a flow chart of an example of a life cycle of a vehicle including the transformer of FIG. 1.

Referring to FIG. 6, a flowchart of an illustrative example of a life cycle of a vehicle (e.g., an aircraft) is depicted and generally designated 600. During pre-production, the method 600 includes specification and design of the vehicle, at 602. During the specification and design of the vehicle, the method 600 includes specifying components, such as one or more of the transformer 100, the VFCVG 204, the first electrical system 220, the rectifier 224, or the second electrical system 228. In one particular example, specification and design of the vehicle includes determining a number of turns for each coil of the transformer 100 (e.g., so that the transformer 100 is configured to "step down" a multiphase AC signal from one voltage to another voltage, such as from 230 Vrms to 115 Vrms, as an illustrative example).

At 604, the method 600 includes material procurement. For example, the method 600 can include procuring materials for the vehicle, such as by procuring materials for one or more of the transformer 100, the VFCVG 204, the first electrical system 220, the rectifier 224, or the second electrical system 228.

During production, the method 600 includes component and subassembly manufacturing, at 606, and system integration of the vehicle, at 608. In some examples, components of the transformer 100 are manufactured or assembled (at 606) and integrated within the vehicle (at 608).

The method 600 includes certification and delivery of the vehicle, at 610, and placing the vehicle in service, at 612. In some implementations, certifying the vehicle includes performing a test process of the components of the vehicle, such as one or more of the transformer 100, the VFCVG 204, the first electrical system 220, the rectifier 224, or the second electrical system 228.

While in service, the vehicle may be scheduled for routine maintenance and service (which may also include modification, reconfiguration, refurbishment, and so on). At 614, the method 600 includes performing maintenance and service on the vehicle. To illustrate, in some examples, performing maintenance and service may include inspecting and servicing one or more of the transformer 100, the VFCVG 204, the first electrical system 220, the rectifier 224, or the second electrical system 228.

In some implementations, performing maintenance and service includes retrofitting the transformer 100 into a vehicle (e.g., an aircraft) to replace an existing system of the vehicle. To illustrate, in some cases, the vehicle can include multiple transformers corresponding separate ATU and TRU systems (e.g., where one transformer functions as an ATU, and where another transformer functions as a TRU). In a particular example, performing maintenance and service includes retrofitting the transformer 100 into the vehicle, such as by removing the ATU and TRU systems and replacing the ATU and TRU systems with the transformer 100, such as described further with reference to FIG. 9.

Figure 7:
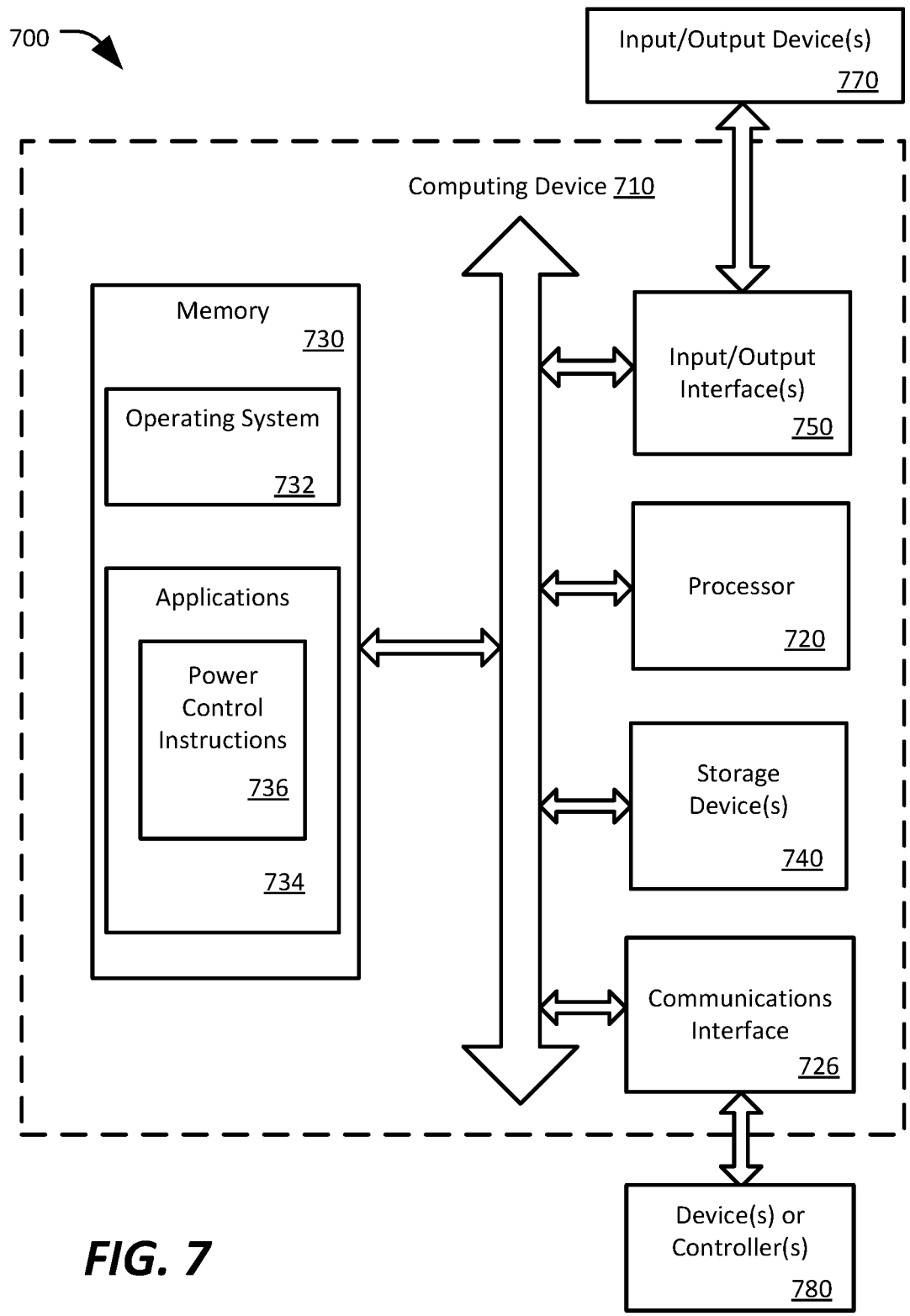
FIG. 7 is a block diagram illustrating aspects of an example of a computing system that is configured to execute instructions to initiate, perform, or control operations, such as operations of the method 500 of FIG. 5.

FIG. 7 is an illustration of a block diagram of a computing environment 700 including a computing device 710. The computing device 710 is configured to support embodiments of computer-implemented methods and computer-executable program instructions (or code) according to the disclosure. In some examples, the computing device 710, or portions thereof, is configured to execute instructions to initiate, perform, or control operations described herein, such as operations of the method 500 of FIG. 5. In some implementations, the computing device 710 is integrated within a vehicle, such as an aircraft.

The computing device 710 includes a processor 720. The processor 720 is configured to communicate with a memory 730 (e.g., a system memory or another memory), one or more storage devices 740, one or more input/output interfaces 750, a communications interface 726, or a combination thereof.

Depending on the particular implementation, the memory 730 includes volatile memory devices (e.g., volatile random access memory (RAM) devices), nonvolatile memory devices (e.g., read-only memory (ROM) devices, programmable read-only memory, or flash memory), one or more other memory devices, or a combination thereof. In FIG. 7, the memory 730 stores an operating system 732, which can include a basic input/output system for booting the computing device 710 as well as a full operating system to enable the computing device 710 to interact with users, other programs, and other devices. The example of FIG. 7 also depicts that the memory 730 stores one or more applications 734 executable by the processor 720. In some examples, the one or more applications 734 include instructions executable by the processor 720 to transmit data or signals between components of the computing device 710, such as the memory 730, the one or more storage devices 740, the one or more input/output interfaces 750, the communications interface 726, or a combination thereof.

In the example of FIG. 7, the one or more applications 734 include power control instructions 736. In a particular example, the processor 720 is configured to execute the power control instructions 736 to initiate or control operations of the system 200, such as by sending one or more control signals to the VFCVG 204 to generate the multiphase AC input signal 208. In this example, the processor 720 is configured to execute the power control instructions 736 to initiate or control operations of the transformer 100 (e.g., by causing the VFCVG 204 to provide the multiphase AC input signal 208 to the transformer 100 to cause the transformer 100 to generate the first multiphase AC output signal 212 and the second multiphase AC output signal 216).

Alternatively or in addition, in some examples, the processor 720 is configured to execute the power control instructions 736 to cause one or more of the first electrical system 220 or the second electrical system 228 to receive power based on the first multiphase AC output signal 212 and the DC output signal 230, respectively. To illustrate, in one example, after activating the VFCVG 204, the processor 720 is configured to execute the power control instructions 736 to activate one or more switches that cause the first electrical system 220 and the second electrical system 228 to receive power based on the first multiphase AC output signal 212 and the DC output signal 230, respectively (e.g., to "power up" the first electrical system 220 and the second electrical system 228).

In some implementations, one or more storage devices 740 include nonvolatile storage devices, such as magnetic disks, optical disks, or flash memory devices. In some examples, the one or more storage devices 740 include removable memory devices, non-removable memory devices or both. In some cases, the one or more storage devices 740 are configured to store an operating system, images of operating systems, applications, and program data. In a particular example, the memory 730, the one or more storage devices 740, or both, include tangible computer-readable media.

In the example of FIG. 7, the processor 720 is configured to communicate with the one or more input/output interfaces 750 to enable the computing device 710 to communicate with one or more input/output devices 770 to facilitate user interaction. In some implementations, the one or more input/output interfaces 750 include one or more serial interfaces (e.g., universal serial bus (USB) interfaces or Institute of Electrical and Electronics Engineers (IEEE) 1394 interfaces), parallel interfaces, display adapters, audio adapters, one or more other interfaces, or a combination thereof. In some examples, the one or more input/output devices 770 include keyboards, pointing devices, displays, speakers, microphones, touch screens, one or more other devices, or a combination thereof. In some examples, the processor 720 is configured to detect interaction events based on user input received via the one or more input/output interfaces 750. Alternatively or in addition, in some implementations, the processor 720 is configured to send information to a display via the one or more input/output interfaces 750.

In a particular example, the processor 720 is configured to communicate with (e.g., send signals to) one or more devices 780 using the communications interface 726. In some implementations, the communications interface 726 includes one or more wired interfaces (e.g., Ethernet interfaces), one or more wireless interfaces that comply with an IEEE 802.11 communication protocol, one or more other wireless interfaces, one or more optical interfaces, or one or more other network interfaces, or a combination thereof. In some examples, the one or more devices 780 include host computers, servers, workstations, one or more other computing devices, or a combination thereof.

Figure 8:
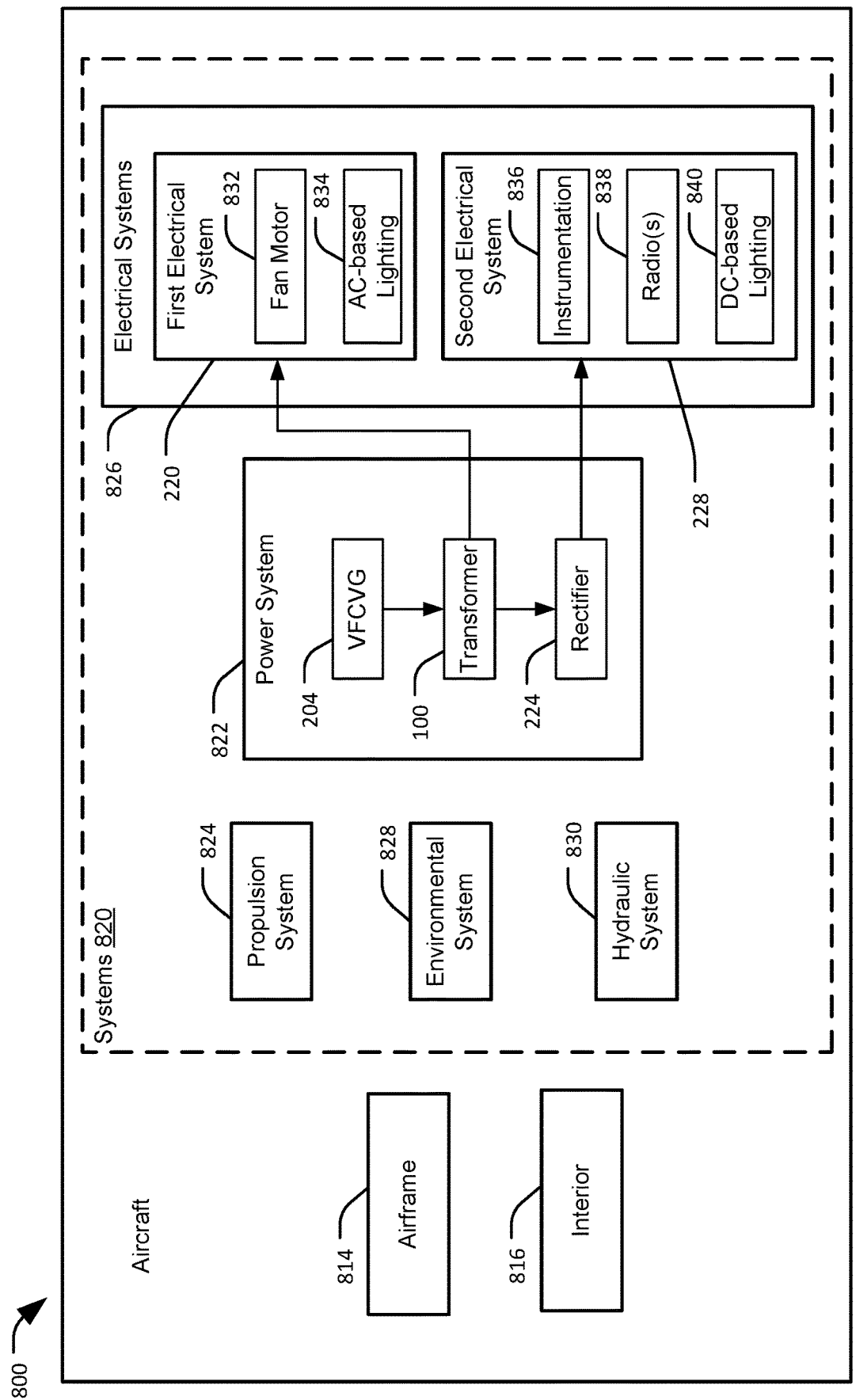
FIG. 8 is a block diagram illustrating aspects of an illustrative implementation of a vehicle that includes the transformer of FIG. 1.

Aspects of the disclosure may be described in the context of an example of a vehicle, such as an aircraft 800 as shown in the example of FIG. 8. As shown in FIG. 8, the aircraft 800 includes an airframe 814 with an interior 816 and a plurality of systems 820. Examples of the plurality of systems 820 include one or more of a propulsion system 824, an environmental system 828, a hydraulic system 830, a power system 822, and electrical systems 826. In the example of FIG. 8, the power system 822 includes the VFCVG 204, the transformer 100, and the rectifier 224. FIG. 8 also illustrates that the electrical systems 826 include the first electrical system 220 and the second electrical system 228. Any number of other systems may be included.

To further illustrate, in the example of FIG. 8, the first electrical system 220 includes a fan motor 832 of the aircraft 800, AC-based lighting 834 of the aircraft 800, one or more other components of the aircraft 800, or a combination thereof. The example of FIG. 8 further illustrates that the second electrical system 228 includes instrumentation 836 of the aircraft 800, one or more radios 838 of the aircraft 800, DC-based lighting 840 of the aircraft 800, one or more other components of the aircraft 800, or a combination thereof.

Figure 9:
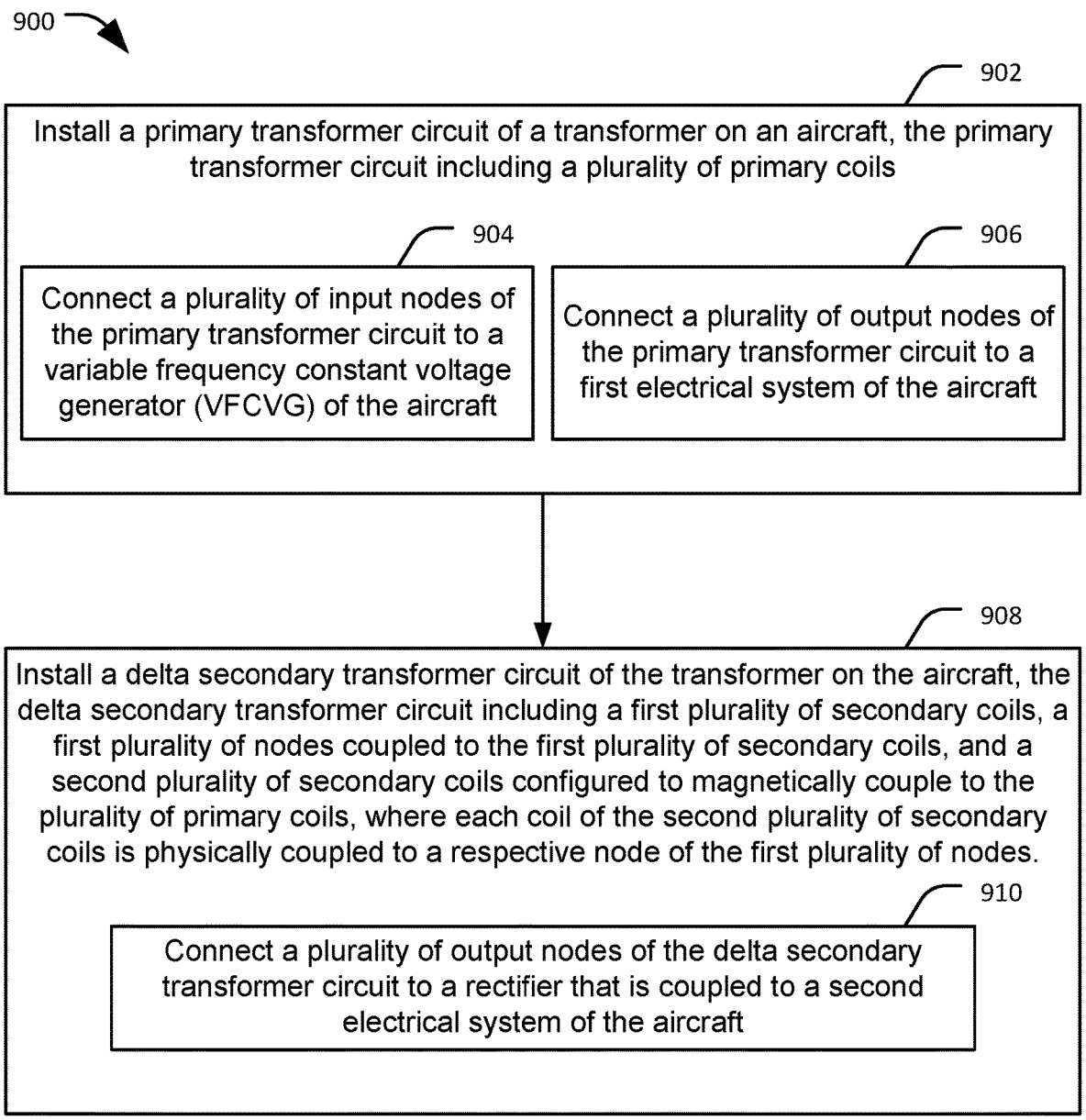
FIG. 9 is a flow chart of an example a method of servicing an aircraft, such as by installing the transformer of FIG. 1.

Referring to FIG. 9, a method of servicing an aircraft is depicted and generally designated 900. In some examples, the method 900 is performed to install a transformer (e.g., the transformer 100 of FIG. 1) within the aircraft 800 of FIG. 8.

The method 900 includes installing a primary transformer circuit of the transformer on the aircraft, the primary transformer circuit including a plurality of primary coils, at 902. For example, primary transformer circuit may correspond to the primary transformer circuit 104, and the plurality of primary coils may correspond to or include the coils 108A, 108B, 108C, 108D, 108E, and 108F.

In some implementations, installing the primary transformer circuit includes connecting a plurality of input nodes (e.g., the nodes 132A, 132B, and 132C) of the primary transformer circuit to a variable frequency constant voltage generator (VFCVG) (e.g., the VFCVG 204) of the aircraft, at 904. Alternatively or in addition, in some implementations, installing the primary transformer circuit includes connecting a plurality of output nodes (e.g., the nodes 136A, 136B, and 136C) of the primary transformer circuit to a first electrical system (e.g., the first electrical system 220) of the aircraft, at 906.

The method 900 further includes installing a delta secondary transformer circuit (e.g., the delta secondary transformer circuit 112) of the transformer on the aircraft, at 908. The delta secondary transformer circuit includes a first plurality of secondary coils (e.g., the coils 116A, 116B, 116C, 120A, 120B, and 120C) and a first plurality of nodes (e.g., the nodes 128A, 128C, and 128B) coupled to the first plurality of secondary coils. The delta secondary transformer circuit further includes a second plurality of secondary coils (e.g., the coils 124A, 124B, and 124C) configured to magnetically couple to the plurality of primary coils, and each coil of the second plurality of secondary coils is physically coupled to a respective node of the first plurality of nodes.

In some implementations, installing the delta secondary transformer circuit includes connecting a plurality of output nodes (e.g., the nodes 140A, 140B, 140C, 144A, 144B, and 144C) of the delta secondary transformer circuit to a rectifier (e.g., the rectifier 224), at 910. In some examples, the rectifier is coupled to a second electrical system (e.g., the second electrical system 228) of the aircraft.

In some implementations, operations of the method 900 are performed to "retrofit" the transformer 100 within an aircraft, such as the aircraft 800 of FIG. 8. In this case, the method 900 can optionally include inspecting, disconnecting, and/or removing components of a conventional transformer from the aircraft prior to installing components of the transformer 100. In other implementations, operations of the method 900 can be performed during fabrication of an aircraft, such as during assembly of the aircraft 800 of FIG. 8.

The illustrations of the examples described herein are intended to provide a general understanding of the structure of the various implementations. The illustrations are not intended to serve as a complete description of all of the elements and features of apparatuses and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate, but do not limit, the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An apparatus comprising:
a primary transformer circuit including a plurality of primary coils, the primary transformer circuit configured to receive a multiphase alternate current (AC) input signal from a variable frequency constant voltage generator (VFCVG); and
a delta secondary transformer circuit configured to magnetically couple to the primary transformer circuit, the delta secondary transformer circuit configured to generate and provide a multiphase AC output signal to a rectifier based at least on the multiphase AC input signal received from the VFCVG, the delta secondary transformer circuit including:
a first plurality of secondary coils;
a first plurality of nodes coupled to the first plurality of secondary coils; and
a second plurality of secondary coils configured to magnetically couple to the plurality of primary coils, wherein each coil of the second plurality of secondary coils is physically coupled to a respective node of the first plurality of nodes.

2. The apparatus of claim 1, wherein the primary transformer circuit is configured to generate a second multiphase AC output signal based at least on the multiphase AC input signal.

3. The apparatus of claim 2, further comprising a first electrical system of an aircraft configured to receive the second multiphase AC output signal.

4. The apparatus of claim 1, further comprising a second plurality of nodes coupled to the second plurality of secondary coils, wherein the first plurality of nodes and the second plurality of nodes are configured to output the multiphase AC output signal.

5. The apparatus of claim 4, further comprising a rectifier coupled to the first plurality of nodes and to second plurality of nodes, wherein the rectifier is configured to generate a direct current (DC) output signal based on the multiphase AC output signal.

6. The apparatus of claim 5, further comprising a second electrical system of an aircraft configured to receive the DC output signal.

7. The apparatus of claim 1, wherein the VFCVG is coupled to the primary transformer.

8. The apparatus of claim 1, further comprising a second transformer core, wherein one or more coils of the plurality of primary coils, one or more coils of the first plurality of secondary coils, and a second coil of the second plurality of secondary coils are associated with the second transformer core.

9. The apparatus of claim 8, further comprising a third transformer core, wherein one or more coils of the plurality of primary coils, one or more coils of the first plurality of secondary coils, and a third coil of the second plurality of secondary coils are associated with the third transformer core.

10. The apparatus of claim 1, further comprising a power system of an aircraft, the power system including a transformer including the primary transformer circuit and the delta secondary transformer circuit.

11. A method of operating a transformer, the method comprising:
receiving, from a variable frequency constant voltage generator (VFCVG), a multiphase alternating current (AC) input signal at the transformer;
generating, using a primary transformer circuit of the transformer and based on the multiphase AC input signal received from the VFCVG, a first multiphase AC output signal;
generating, using a secondary transformer circuit of the transformer, a first plurality of signals of a second multiphase AC output signal based at least on the multiphase AC input signal received from the VFCVG;
generating, using the secondary transformer circuit of the transformer, a second plurality of signals of the second multiphase AC output signal based at least on the multiphase AC input signal received from the VFCVG; and
providing the second multiphase AC output signal to a rectifier.

12. The method of claim 11, further comprising providing the first multiphase AC output signal to a first electrical system of an aircraft.

13. The method of claim 11, further comprising generating, by the rectifier, a direct current (DC) output signal based on the second multiphase AC output signal.

14. The method of claim 13, further comprising providing the DC output signal to a second electrical system of an aircraft.

15. An aircraft comprising:
- a primary transformer circuit including a plurality of primary coils, the primary transformer circuit configured to receive a multiphase alternating current (AC) input signal from a variable frequency constant voltage generator (VFCVG);
- a delta secondary transformer circuit configured to magnetically couple to the primary transformer circuit, the delta secondary transformer circuit configured to generate and provide a multiphase AC output signal to a rectifier based at least on the multiphase AC input signal received from the VFCVG, the delta secondary transformer circuit including:
- a first plurality of secondary coils;
- a first plurality of nodes coupled to the first plurality of secondary coils; and
- a second plurality of secondary coils configured to magnetically couple to the plurality of primary coils, wherein each coil of the second plurality of secondary coils is physically coupled to a respective node of the first plurality of nodes; and
- a rectifier coupled to the delta secondary transformer circuit.

16. The aircraft of claim 15, wherein the VFCVG is coupled to the primary transformer circuit.

17. The aircraft of claim 16, wherein the VFCVG is configured to provide a multiphase alternating current (AC) input signal to the primary transformer circuit.

18. The aircraft of claim 15, further comprising a power system of an aircraft, the power system including the primary transformer circuit, the delta secondary transformer circuit, and the rectifier.

19. The aircraft of claim 18, further comprising a first electrical system of the aircraft configured to receive, from the primary transformer circuit, a first multiphase alternating current (AC) output signal.

20. The aircraft of claim 19, further comprising a second electrical system of the aircraft configured to receive, from the rectifier, a direct current (DC) output signal from the rectifier.

21. A method of servicing an aircraft, the method comprising:
- installing a variable frequency constant voltage generator (VFCVG), the VFCVG configured to generate a multiphase alternating current (AC) input signal;
- installing a primary transformer circuit of a transformer on the aircraft, the primary transformer circuit including a plurality of primary coils, the primary transformer circuit configured to receive the multiphase AC input signal from the VFCVG; and
- installing a delta secondary transformer circuit of the transformer on the aircraft, the delta secondary transformer circuit configured to generate and provide a multiphase AC output signal to a rectifier based at least on the multiphase AC input signal received from the VFCVG, the delta secondary transformer circuit including a first plurality of secondary coils, a first plurality of nodes coupled to the first plurality of secondary coils, and a second plurality of secondary coils configured to magnetically couple to the plurality of primary coils, wherein each coil of the second plurality of secondary coils is physically coupled to a respective node of the first plurality of nodes.

22. The method of claim 21, wherein installing the primary transformer circuit includes connecting a plurality of input nodes of the primary transformer circuit to a variable frequency constant voltage generator (VFCVG) of the aircraft.

23. The method of claim 21, wherein installing the primary transformer circuit includes connecting a plurality of output nodes of the primary transformer circuit to a first electrical system of the aircraft.

24. The method of claim 21, wherein installing the delta secondary transformer circuit includes connecting a plurality of output nodes of the delta secondary transformer circuit to a rectifier that is coupled to a second electrical system of the aircraft.

* * * * *